United States Patent Office 2,898,168
Patented Aug. 4, 1959

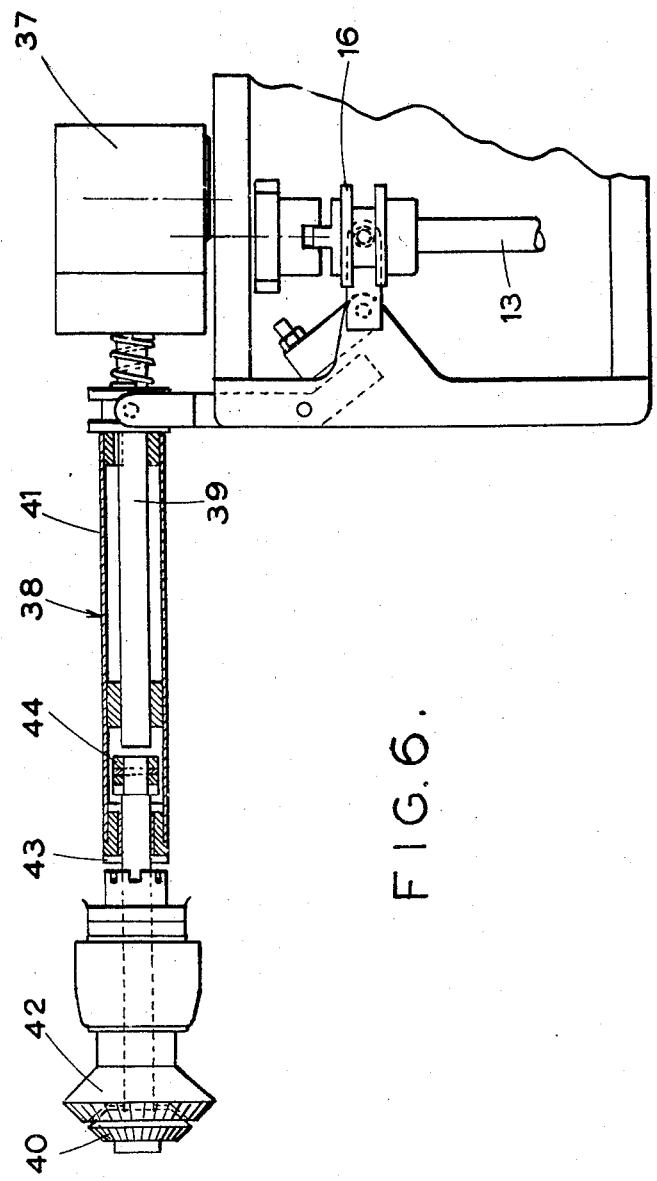

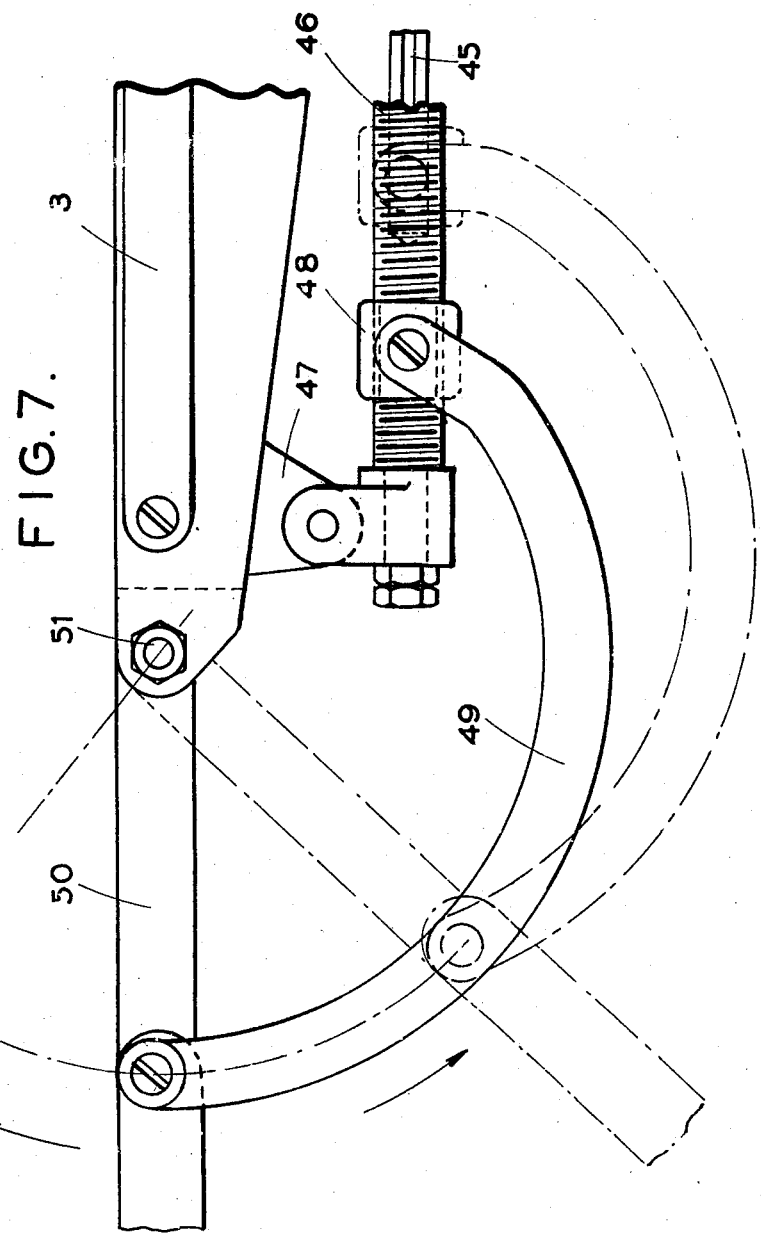

2,898,168

SURGICAL OPERATION TABLE WITH SINGLE CONTROL MEANS

Ronald James Thorpe, Thornton Heath, England, assignor to Allen & Hanburys Limited, London, England, a company of Great Britain Application April 9, 1957, Serial No. 651,790

Claims priority, application Great Britain April 13, 1956

4 Claims. (Cl. 311—7)

This invention relates to surgical operation tables of the type comprising a platform which can support a patient and has two sections capable of providing a flat surface or of being arranged at an angle with respect to each other (i.e. of being arranged in the reflex or flex positions) and the two sections of which can be swung as a unit about an axis extending longitudinally of the platform (i.e. lateral tilt movement) or about an axis extending transversely of the platform (i.e. Trendelenburg or reverse Trendelenburg movement).

It is an object of the present invention to provide an improved operation table of this character which is simple in its construction and operation. Accordingly, the invention provides such a table which has a platform hingedly mounted for rotation about an axis transverse to the platform on a yoke which is itself mounted on a hinge for rotation about an axis extending longitudinally of the platform, a main drive supported beneath the platform and operable by rotation of a handle or the like, three sets of drive gears for moving the platform to a selected position or for adjusting the relative positions of the two platform sections only one of which drive gears can engage the main drive at any one time, and a gear selector for engaging a selected drive gear with the main drive.

In a modification of the invention, the platform has a leg extension section which is hingedly mounted so that it can be rotated with respect to the platform about an axis transverse thereto and an additional, i.e. a fourth, drive gear is provided which can be engaged with the main drive by movement of the gear selector so that the leg extension section can be swung into a desired position with respect to the platform by rotation of the handle or the like.

In the accompanying drawings:

Figure 6 is a sectional view showing a leg-extension section drive gear of a modified table; and Figure 7 is a detail of part of the modified table.

Figure 1:
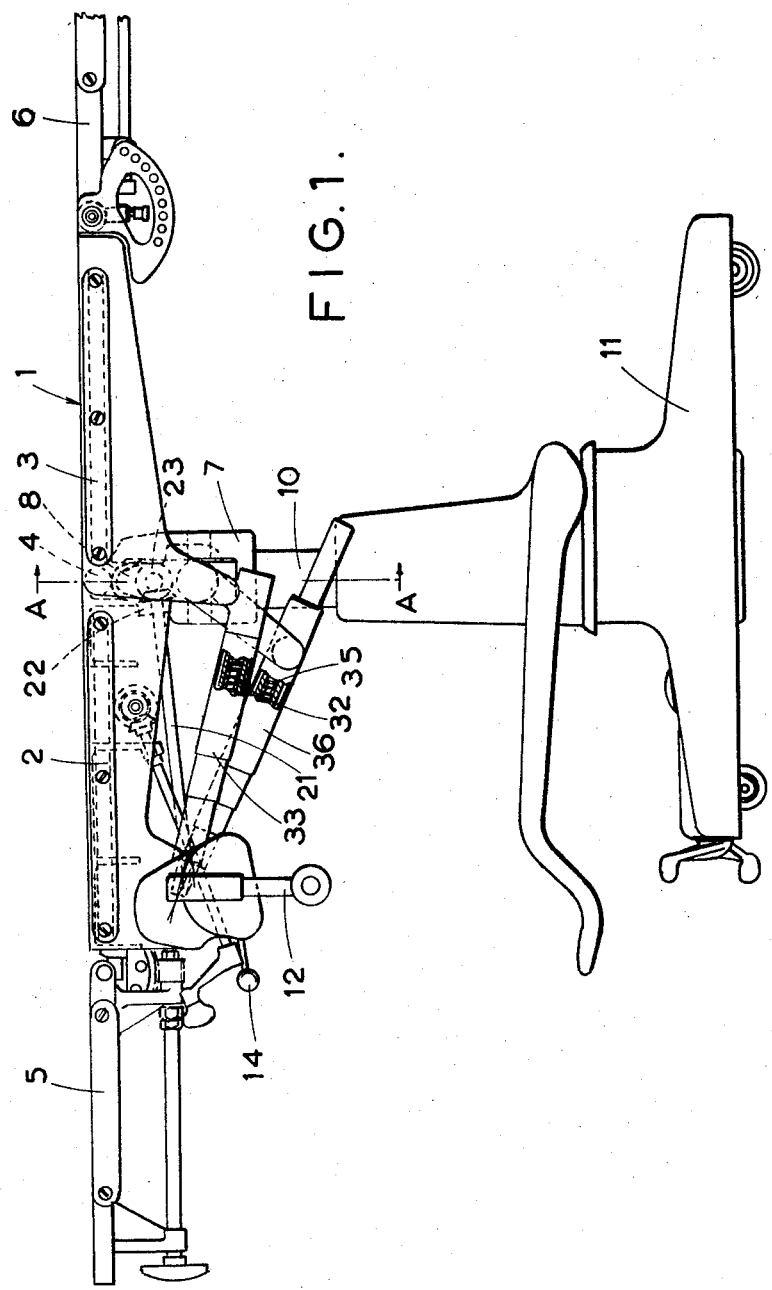
Figure 1 is a side elevation of a surgical operation table constructed in accordance with the present invention.

In the embodiment of the invention illustrated in Figures 1–5, a surgical operation table comprises a platform 1 on which a patient can be supported. This platform is in two sections 2 and 3, called upper and lower trunk sections respectively, which are hingedly connected together by a hinge 4 extending transversely of the table so that they can be arranged at an angle with respect to each other, i.e. in the flex and reflex positions. A head extension section 5 can be removably fitted to the upper trunk section 2 and a leg extension section 6 can be removably fitted to the lower trunk section 3. These head and leg extension sections are preferably so arranged that their positions are interchangeable, i.e. the head extension section 5 can, if desired, be fitted to the lower trunk section 2. By this arrangement, a patient can be so arranged that the position of the platform 1 can be controlled from a place remote from the site of an operation. If desired, the leg extension section 6 can be split longitudinally so as to be in two separate parts.

The platform 1 is supported on a yoke 7 by means of a hinge 8 which permits it to be swung as a unit about an axis transverse to the platform while the two trunk sections are in any desired relative positions. The yoke 7 is itself connected by a hinge 9 (Figure 2) with a support column 10 so that it can be tilted about an axis extending longitudinally of the platform 1 thereby to permit lateral tilt of the platform. The support column 10 is mounted on a wheeled base 11 in a height-adjustable manner.

The position of the platform 1 and the relative positions of its two trunk sections 2 and 3 can be adjusted by rotation of a single handle 12 projecting to one side of the platform near the end of the upper trunk section 2. This handle 12 rotates a main drive shaft 13 (Figure 3) which extends transversely to the platform and is supported in bearings beneath the upper trunk section 2. This main shaft 13 is capable of limited axial displacement under the action of a gear selector lever 14 which is movable in a gate 15.

Figure 2:
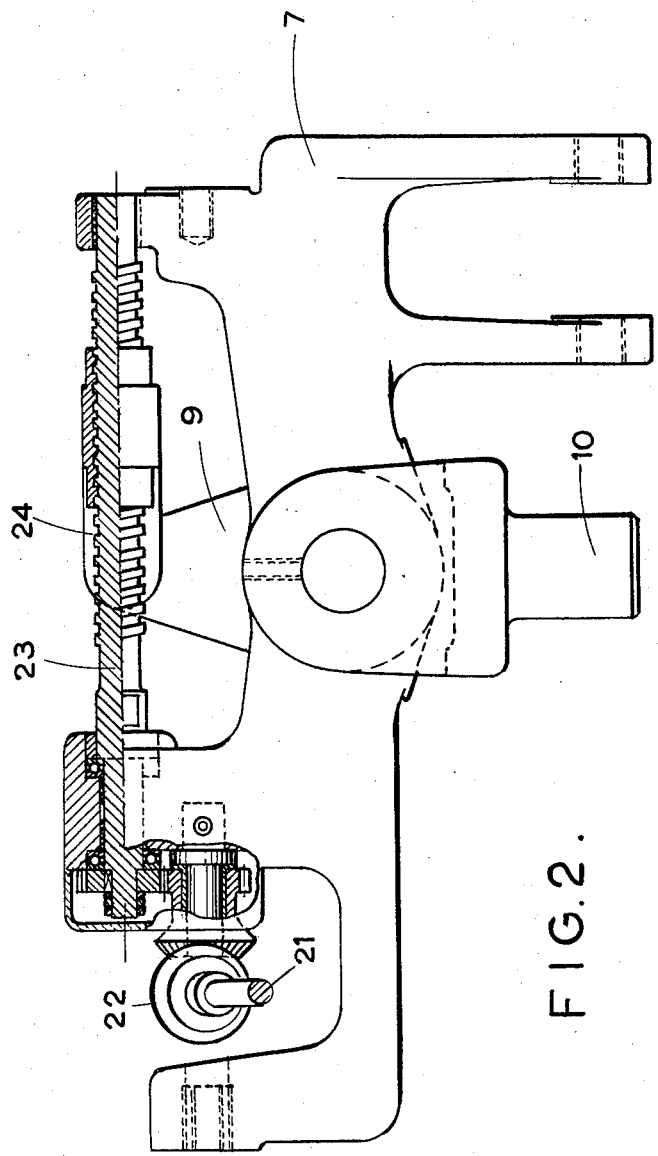
Figure 2 is a section on the line A—A of Figure 1.
Figure 3:
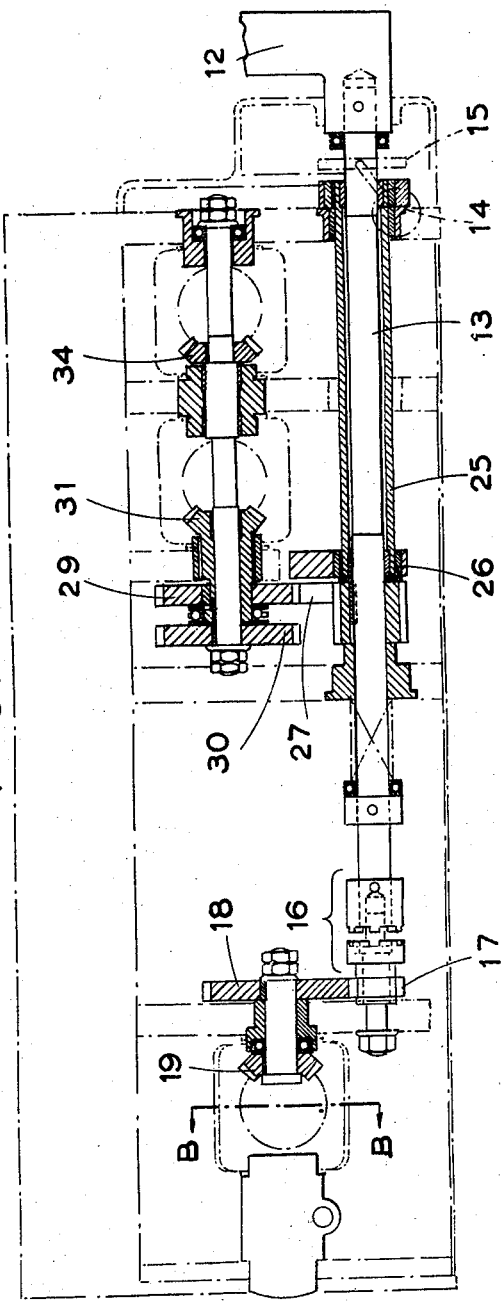
Figure 3 is a sectional plan view of a drive shaft arrangement of the table.
Figure 4:
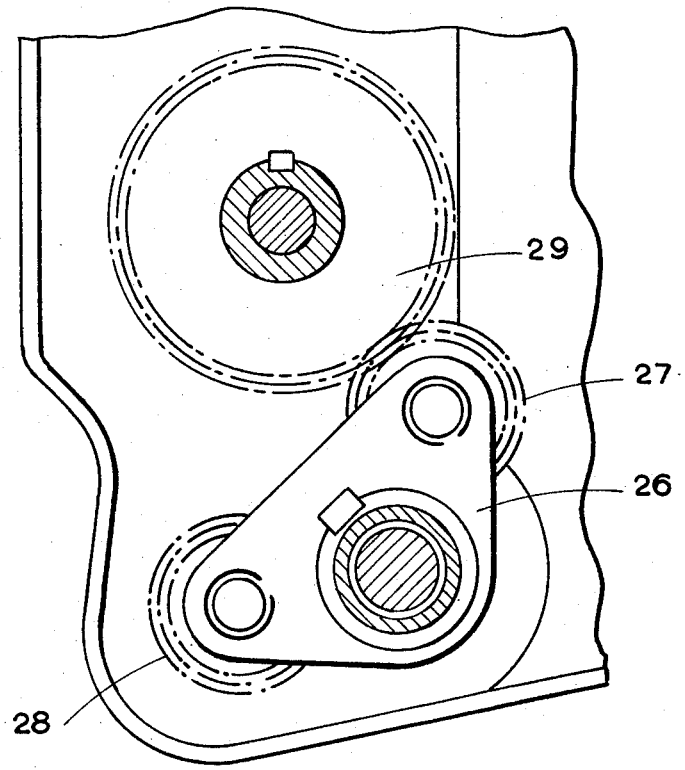
Figure 4 is a detail of a drive gear.

A dog clutch 16 is arranged at one end of the drive shaft 13 and can be engaged or disengaged by axial displacement of the main shaft under the action of the selector lever 14. When this dog clutch 16 is engaged, rotation of the main shaft 13 will rotate a pinion 17 driving a train including a pinion 18, and a bevel gear 19 which meshes with another bevel gear 20 (Figure 5) connected by a shaft 21 with a pinion (Figure 2) to drive a lateral tilt shaft 23 extending across the yoke 7; this shaft 23 is held against axial displacement in the yoke and has an external screw thread as shown in Figure 2. An internally screw threaded bushing 24 runs on the screw thread of the lateral tilt shaft 23 and is linked with the yoke hinge so that the platform can be tilted to one side or the other by rotation of the handle 12, the direction of movement being determined by the direction in which the handle is rotated.

The drive shaft 13 is surrounded by a hollow shaft 25 one end of which is pivotally connected with the selector lever 14 and the other end of which is keyed to a triangular blank 26 carrying two idler pinions 27 and 28 one of which (27) is engageable with a Trendelenburg drive pinion 29 to effect movement of the platform to a Trendelenburg position and the other of which (28) is engageable with a flex drive pinion 30 to move the lower trunk section 3 so that the two trunk sections 2 and 3 are in a flex or break position. The arrangement is such that these two idler pinions 27 and 28 cannot be simultaneously engaged with their respective drive gears and that neither of them can be engaged when the dog clutch 16 is engaged.

Figure 5:
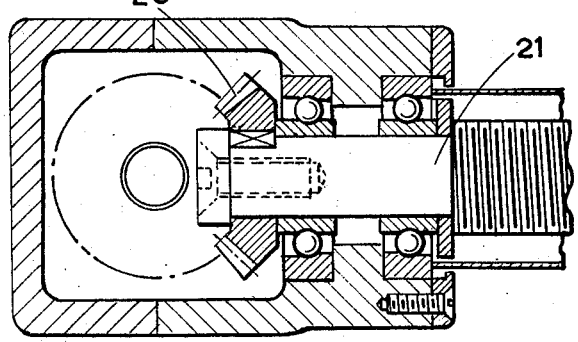
Figure 5 is a section on the line B—B of Figure 3.

The pinion 29 meshes with a bevel gear 31 of a Trendelenburg drive gear to rotate a screw threaded shaft 32 by means of a shaft and gear arrangement exactly similar to the arrangement 20, 21 and 22 shown in Figures 2 and 5 and not, therefore, shown in detail. The shaft 32 works in a screw threaded sleeve 33 (Figure 1) fixed between the yoke 7 and the upper trunk section 2 so that rotation of the handle 12 when this gear is engaged will move the platform in the Trendelenburg or reverse Trendelenburg position depending on the direction of rotation.

The pinion 30 rotates a bevel gear 34 of a flex gear (exactly similar to the gears 20, 21 and 22 of Figures 2 and 5 and not, therefore, shown in detail) to rotate a screw threaded shaft 35 working in a screw threaded sleeve 36 fixed between the upper and lower trunk sections 2 and 3 so that rotation of the handle 12 when this gear is engaged will arrange the two trunk sections in either the flex or reflex position depending on the direction of rotation.

A back elevator can be provided, if desired, and rails can be fitted at the sides of the platform.

In the modification illustrated in Figures 6 and 7, the mechanism for producing lateral tilt movement described with reference to Figure 2 is arranged to produce either lateral tilt movement or rotation of the leg extension section. In this modification, the drive shaft 13 is arranged to act through a gear box 37 and drive a shaft 38, hereinafter called a selector shaft. This selector shaft 38 is in two parts, namely an inner selector shaft 39 at one end of which is a bevel gear wheel 40 forming part of a leg extension drive gear and an outer selector shaft 41 which is a sleeve on the inner shaft 39 and has at one end an outer bevel gear wheel 42 adapted to rotate a lateral tilt shaft exactly the same as shaft 23 (Figure 2) for producing lateral tilt movement, as hereinbefore described.

The selector shaft 38 includes selector clutches 43 and 44 which are actuated by movement axially of the shaft 38 under the action of the gear selector lever 14. The selector clutch 43 can engage the outer selector shaft 41 for rotating the lateral tilt shaft and the clutch 44 can engage the inner selector shaft 39 to effect movement of the leg extension section. One of the two clutches is always engaged and when one is engaged the other is disengaged.

When the gear selector lever 14 is moved to select lateral tilt movement or movement of the leg extension section it first engages the dog clutch 16 on the main drive shaft 13 and then engages the appropriate selector clutch 43 or 44.

The leg extension drive gear is operated by the inner selector shaft 39 and includes an inner operating shaft 45 driven from the bevel gear 40 and an outer operating shaft 46 (Figure 7) which is a sleeve keyed to the inner shaft 45 so that the two shafts can slide axially with respect to each other but which rotate together. This shaft 46 is pivotally mounted on a bracket 47 supported on the underside of the trunk section 3 or on a frame supporting the trunk section. The connection between the inner bevel gear 40 and the inner operating shaft 45 is such as to permit the shaft 45—46 to pivot with respect to the selector shaft 38. The outer operating shaft 46 is externally screw threaded and a nut 48 works on this thread and is held against rotation so that rotation of the shaft 46 causes the nut 48 to move axially of the sleeve. This nut 48 is connected by a link 49 with the underside of a leg extension section 50 so that movement of the nut 48 will swing the leg extension section about a hinge 51.

If desired, the leg extension section can be divided longitudinally, in which case each part of the section is linked with the nut.

A quick release connection can be provided between the leg extension section and the platform and between the leg extension operating linkage and the operating shaft to permit the leg extension to be easily removed from the table if desired.

Among the advantages of the tables provided by the present invention is that it is possible to arrange the two trunk sections 2 and 3 in either of two chair positions respectively facing opposite directions. The approach to the chair is not obstructed by a sub frame when the trunk sections are arranged in either chair position.

What I claim is:

1. A surgical operation table comprising a platform having two sections movable with respect to each other about an axis transverse to the platform and on which a patient can be supported, a yoke on which said platform is mounted for rotation about an axis transverse to said platform, a support on which said yoke is mounted for rotation about an axis extending longitudinally of said platform, a main drive supported beneath said platform, a handle rotatable to operate said main drive, a leg extension section mounted at one end of said platform so that it can be moved with respect to said platform about an axis transverse thereto, a drive shaft, a first drive gear operable from said shaft to tilt said platform about an axis extending longitudinally thereof, a second drive gear operable from said shaft for tilting said leg extension section with respect to said platform, a hollow shaft surrounding said drive shaft, two drive pinions carried by said hollow shaft, one of which pinions can be engaged with a third drive gear for tilting said platform about an axis transverse thereto and the other of which can be engaged with a fourth drive gear for adjusting the relative positions of said two platform sections, a gear selector for selecting one of said drive gears for operation, a handle rotatable to operate the selected drive gear, two selector shafts arranged one within another and engageable with said drive shaft, a first clutch engageable by said gear selector to connect one of said selector shafts with said first drive gear, and a second clutch engageable by said selector lever to connect the other of said selector shafts with said second drive gear.

2. A surgical operation table comprising a platform having two sections movable with respect to each other about an axis transverse to the platform and on which a patient can be supported, a yoke on which said platform is mounted for rotation about an axis transverse to said platform, a support on which said yoke is mounted for rotation about an axis extending longitudinally of said platform, a main drive supported beneath said platform, a handle rotatable to operate said main drive, a leg extension section mounted at one end of said platform so that it can be moved with respect to said platform about an axis transverse thereto, a drive shaft, a first drive gear operable from said shaft to tilt said platform about an axis extending longitudinally thereof, a second drive gear operable from said shaft for tilting said leg extension section with respect to said platform, a hollow shaft surrounding said drive shaft, two drive pinions carried by said hollow shaft, one of which pinions can be engaged with a third drive gear for tilting said platform about an axis transverse thereto and the other of which can be engaged with a fourth drive gear for adjusting the relative positions of said two platform sections, a gear selector for selecting one of said drive gears for operation, a handle rotatable to operate the selected drive gear, two selector shafts arranged one within another and engageable with said drive shaft, a first clutch engageable by said gear selector to connect one of said selector shafts with said first drive gear, a second clutch engageable by said selector lever to connect the other of said selector shafts with said second drive gear, an operating shaft connected with one of said selector shafts, an externally screw-threaded sleeve which is mounted on said operating shaft so as to be rotatable therewith but slidable with respect thereto, an internally screw-threaded nut mounted on said sleeve so as to be movable lengthwise thereof when said sleeve is rotated, and a link connecting said leg extension section with said nut so that movement of said nut will swing said leg extension section.

3. A surgical operation table comprising a platform having two sections movable with respect to each other about an axis transverse to the platform and on which a patient can be supported, a yoke on which said platform is mounted for rotation about an axis transverse to said platform, a support on which said yoke is mounted for rotation about an axis extending longitudinally of said platform, a main drive supported beneath said platform, a handle rotatable to operate said main drive, a leg extension section mounted at one end of said platform so that it can be moved with respect to said platform about an axis transverse thereto, a drive shaft, a first drive gear operable from said shaft to tilt said platform about an axis extending longitudinally thereof, a second drive gear operable from said shaft for tilting said leg extension section with respect to said platform, a shaft associated with said drive shaft, two drive pinions carried by said shaft, one of which pinions can be engaged with a third drive gear for tilting said platform about an axis transverse thereto and the other of which can be engaged with a fourth drive gear for adjusting the relative positions of said two platform sections, a gear selector for selecting one of said drive gears for operation, a handle rotatable to operate the selected drive gear, two selector shafts arranged one within another and engageable with said drive shaft, a first clutch engageable by said gear selector to connect one of said selector shafts with said first drive gear, and a second clutch engageable by said selector lever to connect the other of said selector shafts with said second drive gear.

4. A surgical operation table comprising a platform having two sections movable with respect to each other about an axis transverse to the platform and on which a patient can be supported, a yoke on which said platform is mounted for rotation about an axis transverse to said platform, a support on which said yoke is mounted for rotation about an axis extending longitudinally of said platform, a main drive supported beneath said platform, a handle rotatable to operate said main drive, a leg extension section mounted at one end of said platform so that it can be moved with respect to said platform about an axis transverse thereto, a drive shaft, a first drive gear operable from said shaft to tilt said platform about an axis extending longitudinally thereof, a second drive gear operable from said shaft for tilting said leg extension section with respect to said platform, a shaft associated with said drive shaft, two drive pinions carried by said shaft, one of which pinions can be engaged with a third drive gear for tilting said platform about an axis transverse thereto and the other of which can be engaged with a fourth drive gear for adjusting the relative positions of said two platform sections, a gear selector for selecting one of said drive gears for operation, a handle rotatable to operate the selected drive gear, two selector shafts arranged one within another and engageable with said drive shaft, a first clutch engageable by said gear selector to connect one of said selector shafts with said first drive gear, a second clutch engageable by said selector lever to connect the other of said selector shafts with said second drive gear, an operating shaft connected with one of said selector shafts, an externally screw-threaded sleeve which is mounted on said operating shaft so as to be rotatable therewith but slidable with respect thereto, an internally screw-threaded nut mounted on said sleeve so as to be movable lengthwise thereof when said sleeve is rotated, and a link connecting said leg extension section with said nut so that movement of said nut will swing said leg extension section.

References Cited in the file of this patent
UNITED STATES PATENTS

| | | |
|---|---|---|
| 850,744 | Flanders | Apr. 16, 1907 |
| 1,571,205 | Laurent | Feb. 2, 1926 |
| 2,092,266 | Talas | Sept. 7, 1937 |
| 2,416,410 | Shampaine | Feb. 24, 1947 |
| 2,501,415 | Shampaine | Mar. 21, 1950 |
| 2,647,026 | Shampaine | July 28, 1953 |
| 2,700,583 | Davis et al. | Jan. 25, 1955 |